United States Patent [19]
Habermeier et al.

[11] 3,856,754
[45] Dec. 24, 1974

[54] LINEAR HOMOPOLYESTERS AND COPOLYESTERS BASED ON METHYLENE-BIS(HYDROXYALKYL-DIMETHYL HYDANTOINS)

[75] Inventors: Jurgen Habermeier, Pfeffingen, Switzerland; Lothar Buxbaum, Lindenfels, Germany; Hans Batzer, Arlesheim, Switzerland

[73] Assignee: Ciba-Geigy Corporation, Ardsley, N.Y.

[22] Filed: Aug. 9, 1973

[21] Appl. No.: 387,060

[30] Foreign Application Priority Data
Aug. 25, 1972  Switzerland...................... 12654/72

[52] U.S. Cl............................................. 260/75 N
[51] Int. Cl............................................. C08g 17/08
[58] Field of Search................................. 260/75 N

[56] References Cited
OTHER PUBLICATIONS
Habermeier et al., Helv. Chim. Acta 55, 686–696, (1972 (March)).

*Primary Examiner*—Melvin Goldstein

[57] ABSTRACT

New homopolyesters and copolyesters are obtained by esterifying 1,1'-methylene-bis-[3-(hydroxy-alkyl)-5,5-dimethylhydantoins] and optionally alkanediols with terephthalic acid and/or isophthalic acid or their polyester-forming derivatives in a known manner, and subsequently polycondensing. The new homopolyesters and copolyesters are distinguished, relative to the conventional polyalkylene phthalates, by having better mechanical properties, and are in particular suitable for use as "Engineering Plastic" materials.

3 Claims, 1 Drawing Figure

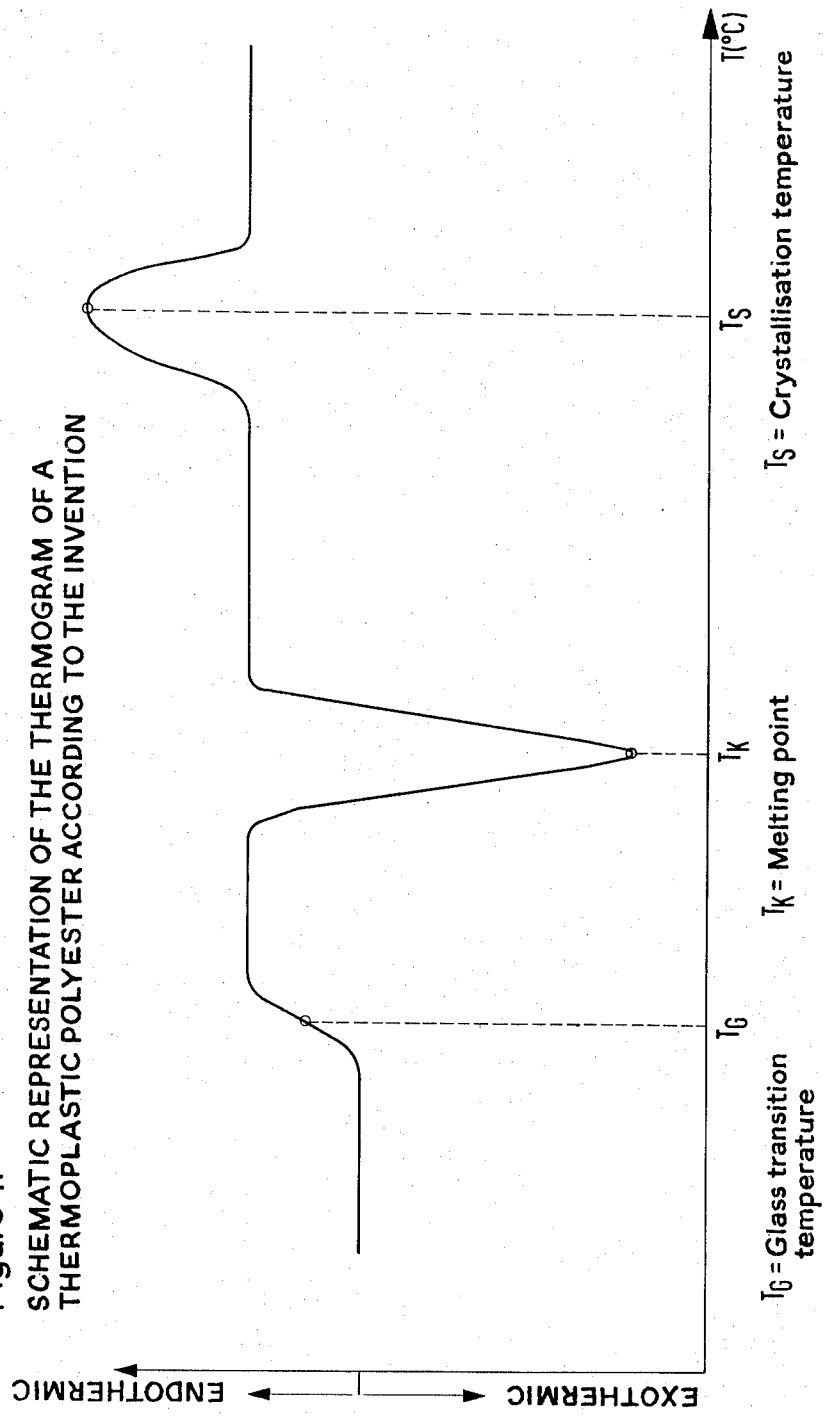

LINEAR HOMOPOLYESTERS AND COPOLYESTERS BASED ON METHYLENE-BIS(HYDROXYALKYLDIMETHYL HYDANTOINS)

The present invention relates to new, linear homopolyesters and copolyesters based on terephthalic acid and/or isophthalic acid which contain, as the diol component, partially or completely defined 1,1-methylene-bis-[3-(2'-hydroxyalkyl)-5,5-dimethylhydantoins], the process for the manufacture of the new polyesters and the use of these polyesters, which are valuable thermoplastic materials.

Thermoplastic polyesters of terephthalic acid and aliphatic diols such as, for example, poly(ethylene terephthalates) and poly(butylene terephthalates), and their use in industry as "engineering thermoplastic" materials, are known. These polyesters, from which mouldings with good mechanical properties can be manufactured, however also display shortcomings. Thus, in general, the glass transition temperature of these polyesters is very low, especially in the case of the poly(butylene terephthalates), which is considered to be a disadvantage in numerous industrial applications, since the mouldings already lose their stiffness at relatively low temperatures. A further disadvantage of the known poly (ethylene terephthalates) and poly(butylene phthalates) is that their processing requires rather high temperatures.

It is furthermore known, from German Offenlegungsschrift (DOS) No. 2,008,984 that the properties of the poly(ethylene phthalates) and poly(propylene phthalates) can be improved by co-condensing dispiro (5.1.5.1) tetradecane-7,14-diol into the polyester, with 15-50% of the ethylene glycol or propylene glycol being replaced by this special, expensive tricyclic diol.

It has now been found that poly(alkylene terephthalates) and poly(alkylene isophthalates) with better properties can also be obtained by co-condensation of 1,1'-methylene-bis[3-(β-hydroxyalkyl)-5,5-dimethylhydantoins], which are cheap to manufacture. It is surprising that the improvement in the properties of these polyesters is also achieved with hydantoin derivatives containing hydroxyethyl groups since it is known that the hydroxyethyl groups do not introduce stiffness into the molecule, because they can rotate freely. On the other hand, the improvements in properties are also achieved in the case of other poly(alkylene terephthalates), such as, for example, poly(butylene terephthalate). Furthermore, the homopolyesters, that is to say polyesters which are only built up from terephthalic acid and/or isophthalic acid and the heterocyclic diol, also show excellent properties.

The homopolyesters and copolyesters according to the invention are distinguished, relative to the poly(alkylene terephthalates), by higher glass transition temperatures and lower melt temperatures and softening temperatures and thus show better thermomechanical properties coupled with better scope for processing.

Hence the subject of the present invention are new linear thermoplastic homopolyesters or copolyesters having a relative viscosity of 0.5 to 3.0 dl/g (decilitres/gram), measured at 30°C on a 1% strength solution consisting of 50 parts of phenol and 50 parts of tetrachloroethane, which are characterised by the structural element of the formula I

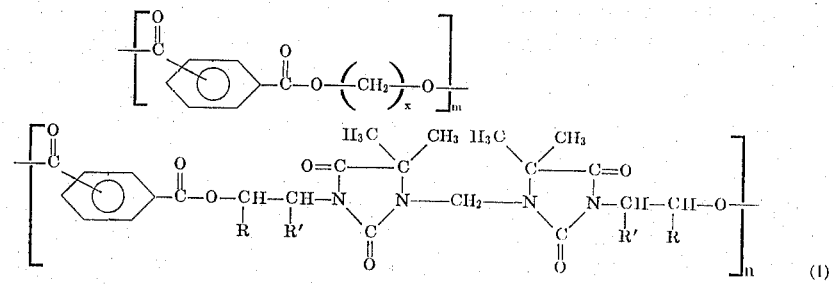

wherein the two carbonyl groups located on the aromatic ring are in the para-position or meta-position to one another, R denotes a hydrogen atom or the methyl or ethyl group, R' denotes a hydrogen atom or together with R denotes the tetramethylene radical, $x$ represents a number from 2 to 10, $m$ represents 0 or integers and $n$ represents integers, with the ratio of $n$ to $m$ corresponding to the quotient of $n/n + m = 0.005$ to $1.0$.

Preferably, the polyesters possessing the structural element of the formula I have a relative viscosity of 1.0 to 2.5 dl/g and preferably, in formula I given above, R denotes a hydrogen atom or the methyl group, R' denotes a hydrogen atom, $x$ denotes a number from 2 to 4 and the ratio of $n$ to $m$ corresponds to the quotient of $n/n + m = 0.05$ to $1.0$.

The new polyesters containing the structural element of the formula I are obtained according to known processes by polycondensing $n$ mols or optionally $n + m$ mols, of terephthalic acid, isophthalic acid or their polyester-forming derivatives with $n$ mols of a diol of the formula II

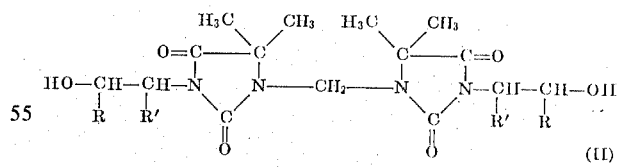

optionally mixed with $m$ mols of an aliphatic diol of the formula III $$HO-(CH_2)_x OH$$

in a molar ratio corresponding to the quotient of $n/n + m = 0.005$ to $1.0$, in the presence of catalysts, in a known manner until a relative viscosity of 0.5 to 3.0 dl/g is reached.

Preferably, the terephthalic acid, isophthalic acid or their polyester-forming derivatives are polycondensed in a molar ratio corresponding to the quotient of $n/n + m = 0.05$ to $1.0$ until a relative viscosity of $1.0$ to $2.5$ dl/g is reached.

The polyester-forming derivatives of terephthalic acid and isophthalic acid which are used in the process are mainly the low molecular dialkyl esters which contain 1 to 4 carbon atoms in the alkyl group, but preferably the dimethyl esters, as well as the diphenyl esters. Further suitable polyester-forming derivatives are also the acid dihalides, especially the acid dichlorides, and the anhydrides of terephthalic acid and isophthalic acid.

The diols of the formula II are known compounds and are obtained according to the process described in German Offenlegungsschrift (DOS) No. 2,003,016 by addition of ethylene oxide, propylene oxide, butylene oxide or cyclohexene oxide to 1,1'-methylene-bis-(5,5-dimethylhydantoin).

Examples of possible diols of the formula II are: 1,1'-Methylene-bis-[3-($\beta$-hydroxyethyl)-5,5-dimethylhydantoin], 1,1'-methylene-bis-[3-($\beta$-hydroxy-n-propyl)-5,5-dimethyl-hydantoin], 1,1'-methylene-bis-[3-($\beta$-hydroxy-n-butyl)-5,5-dimethyl-hydantoin] and 1,1'-methylene-bis-[3-($\beta$-hydroxycyclohexyl)-5,5-dimethyl-hydantoin].

Formula III represents the aliphatic diols of the homologous series from ethylene glycol to 1,10-decanediol.

The new polyesters can be manufactured according to various known processes, for example by solution condensation or azeotropic condensation, by interfacial condensation, melt condensation or solid phase condensation and by a combination of these methods, depending on which starting compounds and reaction catalysts are used.

Preferably, the new polyesters are manufactured by esterifying or trans-esterifying terephthalic acid, isophthalic acid or their low molecular dialkyl esters with the diols of the formula II, preferably mixed with the diols of the formula III, in an inert atmosphere, for example a nitrogen atmosphere, in the presence of catalysts and with simultaneous removal of the resulting water or alkanol at 150°–220°C and subsequently carrying out the polycondensation at 200–270°C and under reduced pressure in the presence of certain catalysts until the polycondensates have the desired viscosity.

Advantageously, in manufacturing the copolyesters according to this process the aliphatic diol component of the formula III is employed in excess so that after the esterification reaction or trans-esterification reaction essentially monomeric diglycol esters of both diols of the formulae II and III are obtained, which are then polycondensed in the presence of a polycondensation catalyst and whilst distilling off the excess aliphatic diol of the formula III in vacuo.

As esterification catalysts it is possible to use, in a known manner, inorganic or organic acids, for example hydrochloric acid or p-toluenesulphonic acid, but also metal compounds, which are also suitable for use as trans-esterification catalysts.

Since some catalysts preferably accelerate the trans-esterification and others accelerate the polycondensation, a combination of several catalysts is preferably used. Suitable trans-esterification catalysts are, for example, the oxides, salts or organic compounds of the metals calcium, magnesium, zinc, cadmium, manganese and cobalt. The metals as such, or alloys of these, can also be used as catalysts. On the other hand, the polycondensation is preferably catalysed by lead, titanium, germanium and especially antimony and their compounds. These catalysts can be added to the reaction mixture conjointly or separately, that is to say before and after the esterification or trans-esterification. These catalysts are employed in amounts of about 0.001 to 1.0% by weight relative to the acid component.

The new homopolyesters or copolyesters can also be manufactured by condensing the starting compounds in the melt until a certain viscosity is reached, then granulating the polycondensate, for example by means of an underwater granulator, drying the granules and then subjecting them to a solid phase condensation, using vacuum and temperatures below the melting point of the granules. This also results in higher viscosities of the polyesters.

Another process for the manufacture of the new polyesters consists of polycondensing the terephthalic dihalides or isophthalic dihalides, preferably the acid dichlorides, with the diols of the formula II, optionally mixed with the diols of the formula III and in a solvent, in the presence of a basic catalyst, in the temperature range of 0° to 100°C, hydrogen halide being split off. Tertiary amines or quaternary ammonium salts are preferably used as basic catalysts. The proportion of the basic catalyst can be from 0.1 to 20 mol % relative to the acid halides. Such condensations can also be carried out in the melt, without the use of a solvent.

The polycondensation reaction is carried out until the polyesters have a relative viscosity of 0.5 to 3.0 dl/g (decilitre/gram), preferably 1.0 to 2.5 dl/g. The reaction times are about 30 minutes to several hours depending on the nature of the catalyst used and the size of the batch. After removal from the reaction vessel the polyester melt obtained is granulated, or converted into chips, in the usual manner.

The polycondensation reaction can also be carried out discontinuously, in which case all customary known measures, such as addition of inert fillers, flameproofing additives pigments and the like, can already be taken during the last condensation steps, for example during the solid phase condensation or at the end of the melt condensation.

When working up the polyester melt, or even before the polycondensation reaction, additives of all kinds which are inert towards the reaction mixture can be added, such as, for example, fillers, reinforcing agents, especially glass fibres, inorganic or organic pigments, optical brighteners, delustering agents and flameproofing or flame-retarding additives.

The homopolyesters and copolyesters according to the invention have predominantly crystalline or predominantly amorphous regions, depending on the use of the starting substances. If they do not contain any coloured additives, the new polyesters are colourless to pale yellow in colour and are thermoplastic materials from which moulded materials having valuable thermomechanical properties can be manufactured according to the customary moulding processes, such as casting, injection moulding and extrusion.

In particular, the new homopolyesters and copolyesters are suitable for use as "engineering plastic" materials which are appropriate for the manufacture of mouldings, such as gearwheels, containers for chemicals or foodstuffs, machine components and apparatus components, sheets, slabs, films and hot-melt adhesives and also for the manufacture of semi-finished goods which can be shaped by machining.

The polyesters manufactured in the examples which follow are characterised in more detail by the following characteristic data:

The polyesters are characterised by the morphological changes which are measured, by means of differential thermoanalysis, on a sample which has been annealed for 3 minutes at 30°C above the melting point or softening point and has then been chilled rapidly. The chilled sample is heated by means of the "DSC-1B" differential calorimeter of Messrs. Perkin-Elmer, using a heating speed of 16°C/minute. The thermogram of the sample (compare the schematic representation in FIG. 1) shows the glass transition temperature (Tg), the crystallisation temperature (Tc) and the melting point (Tm). The glass transition temperature is taken to be the point of inflection in the abrupt increase of the specific heat in the thermogram, the crystallisation temperature is taken to be apex of the exothermic peak and the melt temperature is taken to be the apex of the endothermic peak. The relative viscosity (intrinsic viscosity) of the polycondensates of the examples is determined on solutions of 1 g of polyester in 100 ml of a mixture consisting of equal parts of phenol and tetrachloroethane, at 30°C. The softening point is determined on a heated stage microscope, using a speed of heating of 15°C/minute, a cross being formed from 2 filaments and the softening point being taken to be the temperature at which the sharp angles of the cross disappear.

EXAMPLE 1

300 g of dimethyl terephthalate (DMT), 210 g of ethylene glycol, 55 g of 1,1'-methylene-bis-[3-($\beta$-hydroxyethyl)-5,5-dimethylhydantoin] (M-DMH) (10 mol % relative to DMT), 0.095 g of zinc acetate and 0.108 g of antimony trioxide are introduced into a 2 litre reactor equipped with a stirrer, nitrogen inlet, condenser and temperature measuring device, and the mixture is heated to 186°C. 98% of the amount of methanol theoretically to be expected are distilled off over the course of 1.5 hours whilst stirring and passing nitrogen through the mixture; in the course thereof, the temperature of the reaction mixture rises to 200°C.

The reaction mixture is then heated to 240°C, a vacuum of 50 mm Hg is applied, by means of a waterpump, over the course of half an hour, and at the same time the reaction temperature is raised to 260°C. The vacuum is improved to 0.7 mm Hg over the course of half an hour by means of a vacuum pump, the reaction temperature remaining the same, and is maintained for a further 2.5 hours.

The reactor is opened and vented with nitrogen, and a transparent copolyester having the following characteristic data is obtained:

Relative viscosity: 1.80
Glass transition temperature (Tg): 89°C
Softening point: 158°C

EXAMPLES 2 – 5

Homopolyesters and copolyesters with different concentrations of M-DMH are manufactured analogously to Example 1. The composition and properties are listed in the table which follows:

| Example | M-DMH (mol % relative to DMT) | Relative viscosity | Tg (°C) | Tc (°C) | Tm (°C) |
|---|---|---|---|---|---|
| 2 | 0 | 1.80 | 74 | 132 | 259 |
| 3 | 5 | 1.22 | 80 | 150 | 242 |
| 4 | 50 | 1.62 | 115 | Not crystalline | 168* |
| 5 | 90 | 1.20 | 118 | | 170* |

Tg = glass transition temperature
Tc = crystallisation temperature
Tm = melting point
* = softening point

EXAMPLE 6

300 g of dimethyl terephthalate (DMT), 280 g of 1,4-butanediol, 55 g of 1,1'-methylene-bis-[3-($\beta$-hydroxyethyl)-5,5-dimethylhydantoin] (M-DMH) (10 mol % relative to DMT) and 0.178 g of isopropyl titanate are introduced into a 2 litre reactor equipped with a stirrer, nitrogen inlet, condenser and temperature measuring device. 97% of the amount of methanol theoretically to be expected are distilled off over the course of 1 hour and 35 minutes whilst stirring and passing nitrogen through the mixture, during which time the temperature of the reaction mixture rises to 230°C. After heating the reaction mixture to 240°C, a vacuum of 50 mm Hg is applied over the course of half an hour by means of a water-pump and at the same time the reaction temperature is raised to 253°C. The vacuum is improved to 0.45 mm Hg over the course of 40 minutes by means of a vacuum pump, whilst the reaction temperature remains the same. 5 minutes after reaching this vacuum, the reaction is stopped. A copolyester having the following characteristic data is obtained:

Relative viscosity: 1.98
Glass transition temperature (Tg): 45°C
Crystallisation temperature (Tc): 86°C
Melting point (Tm): 203°C

EXAMPLES 7 – 12

Homopolyesters and copolyesters with various concentrations of M-DMH are manufactured according to Example 6. The composition and properties are listed in the table which follows:

| Example | M-DMH (mol % relative to DMT) | Relative viscosity | Tg (°C) | Tc (°C) | Tm (°C) |
|---|---|---|---|---|---|
| 7 | 0 | 2.26 | 22 | 33 | 225 |
| 8 | 2.5 | 2.00 | 27 | 39 | 220 |
| 9 | 5 | 2.12 | 29 | 54 | 214 |
| 10 | 20 | 1.92 | 59 | 143 | 185 |
| 11 | 30 | 1.36 | 62 | Not crystalline | 115* |
| 12 | 50 | 1.64 | 93 | | 125* |

* Softening point

EXAMPLE 13

0.1 mol of terepthaloyl chloride and 0.1 mol of 1,1'-methylene-bis-[3-($\beta$-hydroxyethyl)-5,5-dimethylhydantoin] together with 200 ml of o-dichlorobenzene, are introduced into a round flask equipped with a stirrer, reflux condenser and nitrogen inlet. After introducing nitrogen, 0.09 g of triethylamine and 0.02 g of magnesium filings are added as the catalyst and the reaction mixture is slowly heated to the boil under a nitrogen atmosphere, whilst stirring. After 16 hours, the evolution of hydrogen chloride has ceased. The reaction mixture is cooled and 1.5 litres of methanol are slowly added to it, whilst stirring vigorously. The polymer which hereupon precipitates is filtered off, washed with pure methanol and dried in vacuo at 120°C. The resulting polyester has the following properties:

| | |
|---|---|
| Relative viscosity: | 1.34 |
| Glass transition temperature: | 132°C |
| Softening point: | 175°C |

EXAMPLE 14

3,380 g of dimethyl terephthalate (DMT), 2,720 g of 1,4-butanediol, 712 g of 1,1'-methylene-bis-[3-(β-hydroxyethyl)-5,5-dimethylhydantoin] (10 mol % relative to DMT) and 2.3 g of tetraisopropyl titanate are introduced into a 10 litre reactor provided with a stirrer, nitrogen inlet, fractionating column and temperature measuring device and the mixture is heated to 140°C. 97% of the amount of methanol theoretically to be expected are distilled off over the course of 2.5 hours whilst stirring and passing nitrogen into the mixture, in the course of which the temperature of the reaction mixture rises to 210°C.

The trans-esterification product thus obtained is transferred to a second reactor and after heating the reaction mixture to 230°C a vacuum of 40 mm Hg is applied over the course of half an hour by means of a waterpump. At that point in time, 588 g of decabromodiphenyl and 294 g of antimony trioxide, suspended in 1,4-butanediol, are introduced into the reactor. The vacuum is improved to 0.50 mm Hg over the course of 45 minutes by means of a vacuum pump, whilst raising the reaction temperature to 250°C. The reaction temperature and vacuum are then maintained at these reaction conditions for 2 hours. Thereafter the reactor is discharged and the resulting copolyester, of relative viscosity 2.22, is granulated.
Processing of the polyester 3 kg of the granules obtained are mixed with 1.5 kg of 3 mm long glass fibres and regranulated in an extruder. The polyester granules containing glass fibres are injection moulded to give test specimens. Light grey test specimens having a smooth surface and the following properties are obtained:

| | |
|---|---|
| Glass transition temperature range: | 45 – 73°C |
| Melting point: | 206°C |
| Enthalpy of melting: | 3.5 cal/g |
| Flexural strength (DIN*53,452: | 1,320.6 kg/cm² |
| Impact strength (DIN 53,453) | 35.77 cm.kg/cm² |
| Heat distortion point according to Martens (DIN 53,458): | 106°C |
| Notched impact strength (DIN 53,453): | 8.81 cm.kg/cm² |
| Inflammability according to UL** 492: | SE - 0 |

\* DIN = Deutsche Industrie-Norm (German Industrial Standard Specification)
\*\* UL = Underwriters Laboratories

EXAMPLE 15

The procedure followed is analogous to Example 14 except that only 356 g of 1,1'-methylene-bis-[3-(β-hydroxyethyl)-5,5-dimethylhydantoin] (5 mol % relative to DMT) are employed.
Processing the polyester The granulated polyester is regranulated with glass fibres, analogously to Example 14.

The polyester granules containing glass fibres are also injection moulded to give test specimens. The test specimens have the same appearance as those manufactured according to Example 14. The thermal and mechanical properties of the test specimens obtained are shown in the table below.
Comparison example (analogous to DOS No. 2,042,450)

A poly(butylene terephthalate) manufactured analogously to Example 14 and 15 is mixed with antimony trioxide and decabromodiphenyl in accordance with Examples 14 and 15 and analogously granulated, mixed with glass fibres and regranulated. The granules thus obtained are injection moulded to give test specimens. The results are listed in the Comparison Table which follows:

| Properties | Test specimens | According to Example 15 | According to Comparison Example (analogous to DOS 2,042,450) |
|---|---|---|---|
| Flexural strength (DIN 53,452) (kg/cm²) | | 1,526.1 | 1,589.8 |
| Impact strength (DIN 53,453) (cm.kg/cm²) | | 44.05 | 25.60 |
| Notched impact strength (DIN 53,453) (cm.kg/cm²) | | 10.72 | — |
| Heat distortion point according to Martens (DIN 53,458) | | 136 (°C) | 156 |
| Inflammability according to UL 492 | | SE – 0 | SE – 0 |
| Glass transition range (°C) | | 41–70 | 41–60 |
| Melting point (°C) | | 216 | 225 |

As can be seen from the comparison, the copolyester according to the invention has almost twice the impact strength of the poly(butylene terephthalate) previously known from DOS No. 2,042,450, whilst having practically the same flexural strength and a heat distortion point, according to Martens, which is only 20°C lower. Furthermore, the copolyester according to the invention, though it has a lower melting point, has a glass transition range which is 10°C higher.

EXAMPLE 16

640 litres of ethylene glycol, 1,000 kg of fused dimethyl terephthalate (DMT) and 91.7 kg (5 mol % relative to DMT) of 1,1'-methylene-bis-[3-(β-hydroxyethyl)-5,5-dimethylhydantoin] are pumped into a 3,800 litre reactor. The temperature of the reaction mixture is raised to 120°C and 500 g of calcium dissolved in 60 litres of ethylene glycol are then carefully added in 2 portions. After 5 minutes, the transesterification reaction starts. After 300 minutes, calculated from the start of the addition of ethylene glcyol, 98% of the theoretical amount of methanol have been distilleed off and the trans-esterification is complete.

The polycondensation is carried out in the usual manner. After adding 230 g of antimony trioxide as the catalyst and allowing a polycondensation time of 5 hours at 270°C and under a vacuum of 0.1 mm Hg, a copolyester of intrinsic viscosity 0.73 dl/g is obtained. The melt is converted into approx. 3 mm long cylindrical granules of elliptical base surface (3 × 2 mm) by means of an underwater granulator of Messrs, "Automatik", Aschaffenburg. 400 kg of granules thus obtained are pre-dried in a tumbler drier of 1 m³ capacity for 3 hours at 50°C under a vacuum of 0.3 mm Hg. Thereafter the granules are heated over the course of 5 hours to 165°C whilst keeping the vacuum the same, and are kept at this temperature for 3 hours. The temperature of the granules is then raised to 215°C over the course of 6 hours whilst continuing to maintain the same vacuum, The granules are now kept at about 215°C for 12 hours and are then cooled. The "intrinsic viscosity" of the granules which have been subjected to solid phase condensation in this way is 1.17 dl/g.

EXAMPLE 17

A polyester is manufactured from terephthaloyl dichloride and 1,1'-methylene-bis-[3-($\beta$-hydroxy-n-propyl)-5,5-dimethylhydantoin] analogously to Example 13. The reaction time is 24 hours. The polyester has the following properties:

| | |
|---|---|
| Relative viscosity: | 1.19 |
| Glass transition temperature: | 140°C |
| Softening point: | 200°C |

EXAMPLE 18

A polyester is manufactured from terephthaloyl dichloride and 1,1'-methylene-bis[3-($\beta$-hydroxycyclohexyl)-5,5-dimethylhydantoin] analogously to Example 13. The reaction time is 28 hours. The polyester has the following properties:

| | |
|---|---|
| Relative viscosity: | 1.10 |
| Glass transition temperature: | 208°C |
| Softening point: | 235°C |

EXAMPLE 19

A polyester is manufactured from isophthaloyl dichloride and 1,1'-methylene-bis-[3-($\beta$-hydroxyethyl)-5,5-dimethylhydantoin] analogously to Example 13. The reaction time is 25 hours. The polyester has the following properties:

| | |
|---|---|
| Relative viscosity: | 1.39 |
| Glass transition temperature: | 108°C |
| Softening point: | 178°C |

EXAMPLE 20

A copolyester is manufactured from dimethyl terephthalate (DMT), ethylene glycol and 10 mol % of 1,1'-methylene-bis-[3-($\beta$-hydroxy-n-butyl)-5,5-dimethylhydantoin] (relative to DMT), analogously to Example 1. The period of polycondensation at 0.8 mm Hg and 275°C is 4 hours. A partially crystalline polyester having the following properties is obtained:

| | |
|---|---|
| Relative viscosity: | 1.24 |
| Glass transition temperature: | 74°C |
| Softening point | 238°C |

EXAMPLE 21

A copolyester is manufactured from dimethyl terephthalate (DMI), 1,6-hexanediol and 50 mol % of 1,1'-methylene-bis-[3-($\beta$-hydroxy-ethyl)-5,5-dimethylhydantoin] (relative to DMT), analogously to Example 6. The period of polycondensation at 0.7 mm Hg and 250°C is 5 hours. A transparent polyester having the following properties is obtained:

| | |
|---|---|
| Relative viscosity: | 1.33 |
| Glass transition temperature: | 70°C |
| Softening point: | 126°C |

EXAMPLE 22

A copolyester is manufactured from 0.1 mol of terephthaloyl chloride, 0.02 mol of 1,1'-methylene-bis[3-($\beta$-hydroxy-ethyl)-5,5-dimethylhydantoin] and 0.08 mol of 1,4-butanediol analogously to Example 13. The reaction time is 26 hours. The copolyester has the following properties:

| | |
|---|---|
| Relative viscosity: | 1.31 |
| Glass transition temperature: | 60°C |
| Crystallisation temperature: | 145°C |
| Melting point: | 185°C |

EXAMPLE 23

15.9 g of diphenyl terephthalate (0.05 mol), 17.8 g of 1,1'-methylene-bis[3-($\beta$-hydroxyethyl)-5,5-dimethylhydantoin] (0.05 mol) and 0.008 g of titanium isopropylate are brought to 250°C in a 100 ml reactor equipped with a stirrer, nitrogen inlet and condenser, over the course of 1 hour, during which phenol begins to distil off. After a further hour, no further phenol distils off. The temperature of the reaction mixture is raised to 270°C and at the same time a vacuum of 0.8 mm Hg is applied. After two hours' reaction time under these conditions, the reactor is vented with nitrogen. A polyester having the following properties is obtained:

| | |
|---|---|
| Relative viscosity: | 1.46 |
| Glass transition temperature: | 133°C |
| Softening point: | 177°C |

Comparison Example

Copolyesters based on dimethyl terephthalate and ethylene glycol, with increasing amounts of 1,1'-methylene-bis-[3-($\beta$-hydroxyethyl)-5,5-dimethylhydantoin], and the homopolyester of dimethyl terephthalate and 1,1'-methylene-bis-[3-($\beta$-hydroxyethyl)-5,5-dimethylhydantoin] are manufactured analogously to Example 1, and the glass transition temperatures of the polyesters obtained are compared with the glass transition temperatures of the polyesters manufactured by way of comparison using identical percentage proportions of 1,3-di-($\beta$-hydroxyethyl)-5,5-dimethylhydantoin instead of 1,1'-methylene-bis-[3-($\beta$-hydroxyethyl)-5,5-dimethylhydantoin].

| Proportion of N,N-heterocyclic-aliphatic diol contained in the polyester instead of ethylene glycol | Glass transition point Tg (°C) Polyester with added 1,3-di-($\beta$-hydroxyethyl)-5,5-dimethyl-hydantoin | Glass transition point Tg (°C) Polyester with added 1,1'-methylene-bis-[3-($\beta$-hydroxyethyl)-5,5-dimethyl-hydantoin] |
|---|---|---|
| 0% | 74 | 74 |
| 10% | 74 | 86 |
| 50% | 79 | 115 |
| 100% | 82 | 130 |

As can be seen from the measurements shown in the table, the polyesters according to the invention show a distinct rise in the glass transition temperatures in comparison to the polyesters manufactured using 1,3-di-(β-hydroxyethyl)-5,5-dimethylhydantoin.

We claim:

1. A linear, thermoplastic homopolyester or copolyester having a relative viscosity of 0.5 – 3.0 dl/g, measured at 30°C on a 1% strength solution consisting of equal parts of phenol and tetrachloroethane, said polyester consisting essentially of the structural element of the formula

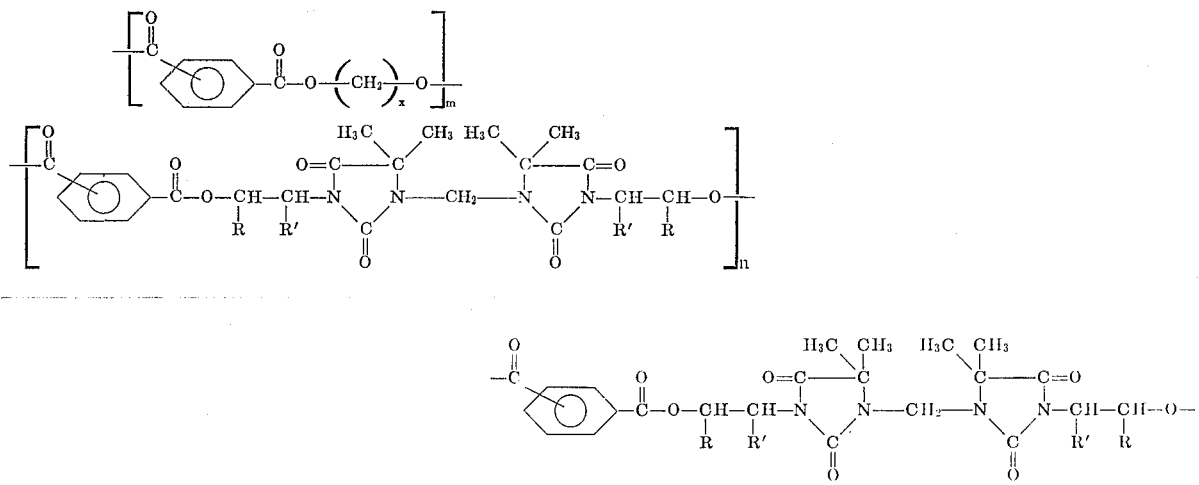

wherein the two carbonyl groups located on the aromatic ring are in the para-position or meta-position to one another, R denotes a hydrogen atom, the methyl or ethyl group, R' denotes a hydrogen atom or together with R denotes the tetramethylene radical, $x$ represents a number from 2 to 10, $m$ represents 0 or integers and $n$ represents integers, with the ratio of $n$ to $m$ corresponding to the quotient of $n/m + n = 0.005$ to 1.0.

2. A copolymer according to claim 1, of relative viscosity 1.0 to 2.5 dl/g, wherein in the formula, R denotes a hydrogen atom or the methyl group and R' denotes a hydrogen atom, $x$ represents a number from 2 to 4 and the ratio of $n$ to $m$ corresponds to the quotient of $n/n + m = 0.05$ to 1.0.

3. A homopolyester according to claim 1, consisting essentially of the recurring structural element of the formula wherein R and R' each denote a hydrogen atom or R denotes the methyl group and R' a hydrogen atom or R and R' together denote the tetramethylene radical.

* * * * *